US007002708B2

(12) United States Patent
Damera-Venkata

(10) Patent No.: US 7,002,708 B2
(45) Date of Patent: Feb. 21, 2006

(54) DELAYED DECISION DOT PLACEMENT FOR PLANE-DEPENDENT CMYK ERROR DIFFUSION

(75) Inventor: Niranjan Damera-Venkata, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 842 days.

(21) Appl. No.: 10/032,995

(22) Filed: Oct. 29, 2001

(65) Prior Publication Data

US 2003/0081230 A1 May 1, 2003

(51) Int. Cl.
*G06F 15/00* (2006.01)

(52) U.S. Cl. ............... 358/1.9; 358/3.03; 358/3.06; 358/3.05; 358/3.09; 358/534; 358/535; 358/502; 382/252; 382/167

(58) Field of Classification Search ............... 382/252, 382/167; 347/15, 43; 358/1.9, 3.03, 3.05, 358/3.06, 3.09, 3.1, 502, 532, 534–536
See application file for complete search history.

(56) References Cited

U.S. PATENT DOCUMENTS

| 5,812,744 | A | * | 9/1998 | Allebach et al. ............ 358/1.9 |
| 5,949,965 | A | * | 9/1999 | Gondek ...................... 358/1.9 |
| 5,973,803 | A | * | 10/1999 | Cheung et al. ............. 358/534 |
| 5,991,512 | A | * | 11/1999 | Shaked et al. .............. 358/1.9 |
| 6,057,933 | A | | 5/2000 | Hudson et al. ............. 358/1.9 |
| 6,250,733 | B1 | * | 6/2001 | Yao et al. ..................... 347/15 |
| 6,260,948 | B1 | * | 7/2001 | Li et al. ....................... 347/43 |
| 6,363,172 | B1 | * | 3/2002 | Cheung et al. ............. 382/167 |
| 6,474,766 | B1 | * | 11/2002 | Cooper ....................... 347/15 |
| 6,483,606 | B1 | * | 11/2002 | Klassen et al. ............. 358/1.9 |
| 6,501,564 | B1 | * | 12/2002 | Schramm et al. ........... 358/1.9 |
| 6,637,851 | B1 | * | 10/2003 | Velde et al. ................. 347/15 |
| 6,867,884 | B1 | * | 3/2005 | Rozzi ........................ 358/1.9 |
| 2003/0011794 | A1 | * | 1/2003 | Yao et al. .................... 358/1.9 |

\* cited by examiner

*Primary Examiner*—Kimberly Williams
*Assistant Examiner*—Beniyam Menberu

(57) ABSTRACT

A printing method and system thereof are described. The locations in a printed image for a plurality of first color (e.g., cyan) dots and the locations in the printed image for a plurality of second color (e.g., magenta) dots are determined. Locations in the printed image for a plurality of third color dots (e.g., yellow) are then determined. The locations for the third color dots are dependent on the locations of the first color dots and the locations of the second color dots. The decision on where to place third color dots is thus made after, and therefore dependent on, the decisions on where to place first color dots and second color dots. Accordingly, color fluctuations in the printed image are minimized, resulting in superior color smoothness and improving the quality of the printed image.

19 Claims, 5 Drawing Sheets

DELAYED DECISION DOT PLACEMENT FOR PLANE-DEPENDENT CMYK ERROR DIFFUSION

TECHNICAL FIELD

The present invention relates to a printing method and system for determining color dot placement in a printed image. More specifically, the present invention pertains to a printing method and system that jointly considers three color planes when making decisions with regard to dot placement.

BACKGROUND ART

Rendered images (e.g., displayed or printed images) may be represented as a two-dimensional array of picture elements (pixels). The color intensity level of each pixel is chosen according to the output (rendering) device. For example, a computer monitor used for displaying an image may have 256 or more levels of intensity for each color. Computer monitors typically use the primary colors red, green and blue, which can be combined to produce millions of different colors including black.

Printers (and other hardcopy output devices) are commonly provided with three ink colors (cyan, magenta and yellow) or four ink colors (cyan, magenta, yellow and black). Many types of printers, such as inkjet printers, eject droplets of ink to form dots on a print medium. Such printers are typically binary devices, meaning that for each pixel or possible dot location on the print medium, the printer can only print at two levels per color; that is, it can either print a dot at the intensity level of the ink, or it cannot print a dot. Thus, a pixel in an image displayed on a monitor can have an intensity value in the range of 0–255, while a pixel in a printed image can have an intensity value of either zero or 255. Because binary-type printers cannot print colors at 256 levels of color intensity, some type of technique is needed to convert the monitor (displayed) version of the image into the binary version used for printing.

Conversion techniques are known in the art as halftoning. One halftoning approach known in the art is error diffusion. With error diffusion, a decision about whether or not to print a dot of a particular color at a particular location, or how many overlapping dots of a color to print at a location, is based not only on the "ideal" or original intensity (0–255) at that location but also on what happened at neighboring locations. The objective is to intelligently place dots on the print medium so that, to the human visual system, the printed image is a visually accurate enough representation of the actual or displayed image.

When printing a color image, dots for the three primary colors (e.g., cyan, magenta and yellow) are printed in various combinations that, along with the locations at which no dot is printed, achieve the color tones needed to reproduce the original color image. Some prior art error diffusion techniques operate on one of the color planes (e.g., the cyan, magenta or yellow plane) at a time. These types of error diffusion techniques generate a pattern of dots for each color independently of the pattern of dots for each of the other colors. Although computationally efficient, such techniques can unintentionally overlap dots from different color planes or inappropriately place (clump) dots from different color planes in adjacent locations, creating an undesirable color combination or resulting in a displeasing pattern.

Other prior art error diffusion techniques attempt to address these shortcomings by considering more than one color plane at time. These techniques employ sophisticated error diffusion algorithms to consider all of the color planes jointly. However, the complexity of these techniques can consume a significant portion of the computational resources available and can slow down the printing process.

One such prior art technique is described in U.S. Pat. No. 5,949,965 by Jay S. Gondek, "Correlating Cyan and Magenta Planes for Error Diffusion Halftoning," issued Sep. 7, 1999, assigned to the assignee of the present invention and hereby incorporated by reference. In the reference, the cyan and magenta planes are treated dependently, such that the placement of cyan dots and magenta dots is determined together so that undesirable combinations of these colors do not occur. The reference states that the techniques described therein may be extended so that the cyan, magenta and yellow planes are considered together. However, consideration of the yellow plane together with consideration of the cyan plane and the magenta plane substantially increases the complexity of the calculations that are involved and the amount of computational resources required. Generally speaking, if the technique described in the reference is used to consider the cyan, magenta and yellow planes together, the computational effort increases by an order of magnitude, with an attendant increase in the computational resources required.

Complexity is often reduced in prior art methods by observing that the unintended overlap or clumping of cyan and magenta dots, producing a blue tone, is the most undesirable. Prior art techniques (including the Gondek reference) therefore halftone only the cyan and magenta planes dependently, thereby reducing the number of instances in which cyan and magenta are overlapped or clumped.

Nevertheless, this approach is not completely satisfactory because it remains deficient with regard to the placement of yellow dots. That is, the prior art attempts to strike a compromise between the quality of the printed image and computational efficiency by treating only the cyan and magenta planes dependently. Because of the complexity associated with treating three planes dependently, the yellow plane is left to independent treatment. As a result of treating the yellow plane independently, interference can occur between yellow dots and cyan dots (producing inadvertent green dots) or between yellow dots and magenta dots (producing inadvertent red dots), which could cause unpleasant color fluctuations in the printed image.

Accordingly, what is needed is a method and/or system that can properly consider the yellow plane as well as the cyan and magenta planes, but without substantially increasing the complexity of the calculations or the amount of computational resources required. The present invention provides a novel solution to the above needs.

DISCLOSURE OF THE INVENTION

The present invention provides a method and system thereof that consider the cyan, magenta and yellow planes together without substantially increasing computational complexity and without consuming significant computational resources.

The present embodiment of the present invention pertains to a printing method and system thereof that can be used to halftone images in binary print devices. In accordance with the present invention, the positions in a printed image for a plurality of first color (e.g., cyan) dots and the positions in the printed image for a plurality of second color (e.g., magenta) dots are determined. Positions in the printed image for a plurality of third color dots (e.g., yellow) are then determined. The positions for the yellow dots are dependent on the positions of the cyan dots and the positions of the magenta dots. The decision on where to place yellow dots is thus made after, rather than together with, the decision on where to place cyan dots and magenta dots.

In one embodiment, a determination is made with regard to the placement of a cyan dot and/or a magenta dot at a particular print location. After this determination is made, a determination is made with regard to whether a yellow dot is to be printed at the same particular location. In this embodiment, the printing of a yellow dot at the same particular location is dependent on satisfying one or more conditions. In their essence, the conditions are used to decide when a yellow dot can be acceptably overlapped with a dot of another color (e.g., a cyan and/or magenta dot) when a dot of another color has been placed at a location. If the condition(s) are satisfied, a yellow dot is printed at the location; otherwise, a yellow dot is not printed.

In one embodiment, the conditions for printing a yellow dot are summarized as follows:

A yellow dot may be printed at a particular location when neither a cyan dot nor a magenta dot are to be printed at that location. In some instances, a yellow dot may not be printed based on a threshold value determined using an error diffusion technique.

A yellow dot may not be printed at a particular location when both a cyan dot and a magenta dot are to be printed at that location.

When either a cyan dot or a magenta dot is to be printed at a particular location, a yellow dot may be printed depending on other factors. If the amount of fill at that location is less than 100 percent, a yellow dot cannot be printed. If the amount of fill is greater than or equal to 100 percent, a yellow dot may be printed based when other conditions determined using an error diffusion technique are satisfied. These conditions are described in greater detail later herein.

In summary, the present invention introduces a method and system in which decisions about third color (e.g., yellow) dot placement are delayed instead of being made at the same time as decisions about first color (e.g., cyan) and second color (e.g., magenta) dot placement. Accordingly, decisions about where to place a yellow dot can be made based on the decisions already made about where to place cyan and/or magenta dots.

The present invention introduces dependent treatment of the cyan, magenta and yellow planes without introducing undue computational complexity. By treating the cyan, magenta and yellow planes dependently, the present invention minimizes color fluctuations in the printed image, resulting in superior color smoothness and improving the quality of the printed image. These and other objects and advantages of the present invention will become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
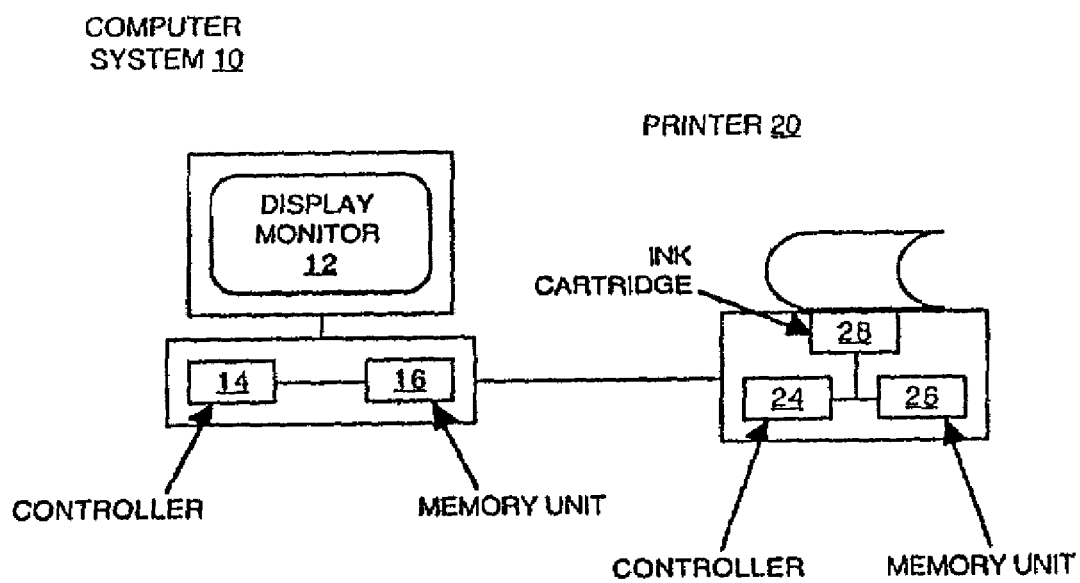
FIG. 1 is a functional block diagram of a computer system and printer upon which embodiments of the present invention may be implemented.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "satisfying," "performing," "limiting" or the like, refer to actions and processes (e.g., processes 200, 300, 400 and 442 of FIGS. 2 through 5, respectively) of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

FIG. 1 is a functional block diagram of a computer system 10 and printer 20 upon which embodiments of the present invention may be implemented. Computer system 10 includes a controller 14 (e.g., a processor) coupled to a memory unit 16. Computer system 10 is coupled to (or incorporates) a display monitor 12. Controller 14 is for processing information and instructions and memory unit 16 is for storing information and instructions for controller 14. Display monitor 12 is for displaying information to a computer user. Display monitor 12 uses the primary colors red (R), green (G) and blue (B), and their combinations, to produce different colors in a displayed image. It is understood that computer system 10 may also include other elements not illustrated.

Printer 20 is a binary print device. In one embodiment, printer 20 includes a controller 24 coupled to a memory unit 26. Controller 24 is for controlling the printing of an image and memory unit 26 is for storing information and instructions for controller 24. Memory unit 26 may also be used for storing information received from computer system 10. In one embodiment, printer 20 is a color inkjet printer. Color inkjet printers are known in the art.

In various embodiments, printer 20 incorporates one or more ink cartridges 28 containing cyan (C), magenta (M), and yellow (Y) inks (or inks substantially the same as those colors). In one embodiment, these colors are combined (that is, dots of different colors can be overlapped during printing) to form different colors including black (composite black). In another embodiment, black (K) ink is provided in addition to the cyan, magenta and yellow inks. The colors may separately reside in a single ink cartridge, or in multiple separate ink cartridges. The print cartridges may print at any resolution, typically measured in dots-per-inch (dpi).

For simplicity of discussion, the present invention is described in terms of a four-color printer (e.g., CMYK); however, it is appreciated that the present invention can also be use for three-color printers (CMK). As will be seen, the present invention can also be extended for use with printers using more than four primary colors.

Figure 2:
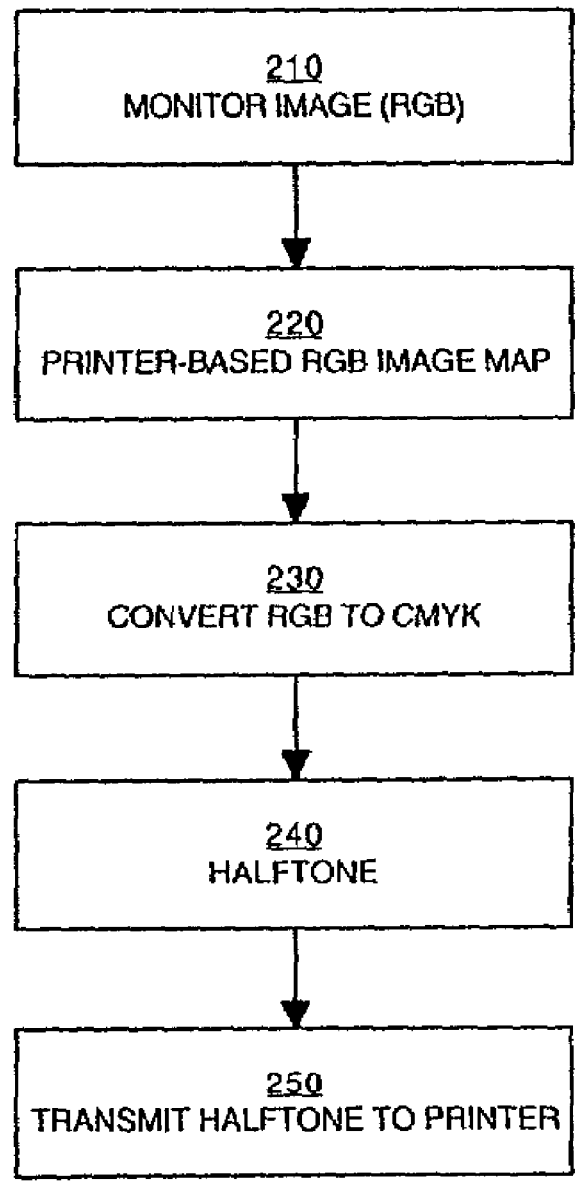
FIG. 2 is a flowchart of a process for converting a monitor (displayed) image into a print image in accordance with one embodiment of the present invention.

FIG. 2 is a flowchart of a process 200 for converting a monitor (displayed) image into a print image in accordance with one embodiment of the present invention. Process 200 can be implemented on computer system 10 or on printer 20 (FIG. 1), or some aspects of process 200 can be implemented on computer system 10 while other aspects are implemented on printer 20.

In step 210 of FIG. 2, in the present embodiment, an image is introduced to or created in memory unit 16 of computer system 10 so that it can be displayed on monitor 12 (FIG. 1). In order to be displayed on display monitor 12, this image in represented in additive RGB color space. In one embodiment, each pixel location on the screen of display monitor 12 can be illuminated in red, green and blue at any one of 256 (0–255) levels of intensity. An original color intensity value (0–255) is associated with each pixel in the displayed image. For each of the primary colors red, green and blue, eight (8) bits are needed to represent the 256 possible color intensity levels. It is worth noting that, although the present invention is described for the case in which there are 256 levels of intensity in the displayed image, the present invention is well-suited for more or less than 256 intensity levels.

In step 220 of FIG. 2, the image in memory unit 16 is converted to an RGB image at the resolution (dpi) of the printer 20 (FIG. 1). In step 230, the RGB image is converted to CMYK color space using a known conversion technique. The colors cyan, magenta, yellow and black are represented by 8 bits per color at this point in the process.

In step 240 of FIG. 2, the CMYK image is halftoned to convert the image from 8 bits per color to one bit per color (binary color) that can be printed using binary printer 20. In other words, the RGB color and 256-level intensity at each pixel location is converted into a pattern of C, M, Y or K dots, each dot having an intensity level of zero (no dot) or 255, represented as a binary zero and a binary one. It is understood that only a portion of the image may be halftoned at a time. The halftoned image is stored in memory (e.g., memory unit 16 of computer system 10 of FIG. 1).

In the present embodiment, halftoning is achieved using an error diffusion technique. Error diffusion techniques recognize that, for each point representing a potential dot position, there is usually a difference (an error) between the actual image intensity and what the hardcopy output device (e.g., printer 20) will print. The error term is calculated by considering the difference between a pixel's modified intensity (0–255 plus or minus any error terms accumulated from previously processed pixels) and the intensity of the pixel that will be printed (0 or 255) using binary printer 20. If a dot is printed (the dot having an intensity level of 255) and the modified pixel intensity is less than 255, the error is positive. If no dot is printed and the modified pixel intensity is greater than zero, the error is negative.

Error diffusion techniques diffuse the error to neighboring pixels using some type of diffusion scheme that is known in the art. That is, a certain fraction of the error is added to the original intensity value of one of the neighboring pixels, another fraction of the difference is added to the original intensity value of another neighboring pixel, and so on. A pixel may receive an error term from more than one neighboring pixel. The error is accumulated for each pixel and added to the pixel's original intensity value. The pixel's original intensity value plus the accumulated error (if any) is compared to a threshold value that has been specified for the print location corresponding to the pixel. If the intensity value (including any error) is greater than the threshold, then a dot will be printed at that print location; if the intensity value (including any error) is not greater than the threshold, a dot will not be printed. In either case, the difference between the intensity value that is assigned (either zero or 255) and the modified image intensity (0–255 adjusted for any error) is derived, and this difference is apportioned to selected neighboring pixels.

Continuing with reference to FIG. 2, in accordance with the present invention, the halftoning step 240 considers the yellow dot placement after the placement of cyan and magenta dots has been determined. Significantly, yellow dot placement is dependent on placement of the cyan and magenta dots. The present invention determines when it is appropriate to overlap a yellow dot with a cyan dot or with a magenta dot, and when it is not appropriate to do so. For example, cyan and yellow dot overlap is justified if a green color tone is desired, and magenta and yellow dot overlap is justified if a red color is desired. In a three color printer in which there is no black color ink, the overlap of cyan, magenta and yellow may be justified to produce a composite black color.

In step 250, in one embodiment, the halftoning results are transmitted to a printer such as printer 20 of FIG. 1.

While the present invention is described for the placement of yellow dots dependent on the placement of cyan and magenta dots, it is understood that the present invention can be generally applied to the placement of dots of a third color dependent on the placement of dots of a first color and the placement of dots of a second color. It is also understood that the present invention can be extended for use with more than three colors.

Figure 3:
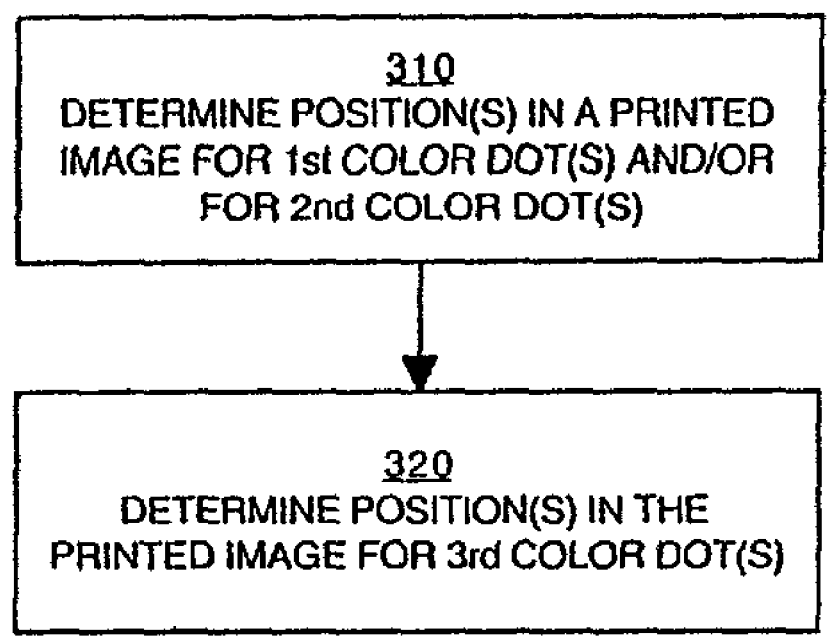
FIG. 3 is a flowchart of one embodiment of the general method implemented in accordance with the present invention.

FIG. 3 is a flowchart of one embodiment of the general method 300 implemented in accordance with the present invention. Method 300 can be implemented on computer system 10 or on printer 20 (FIG. 1), or some aspects of method 300 can be implemented on computer system 10 while other aspects are implemented on printer 20.

In step 310 of FIG. 3, the positions in a printed image for a plurality of first color dots and the positions in the printed image for a plurality of second color dots are determined. In one embodiment, the first color and the second color are cyan and magenta (or like colors).

In step 320, positions in the printed image for a plurality of third color dots are then determined. In one embodiment, the third color is yellow or a like color. Thus, according to the present invention, the positions for the third color dots are dependent on the positions of the first color dots and the positions of the second color dots. The decision on where to place third color dots is thus made after, rather than together with, the decision on where to place first color dots and second color dots.

In accordance with the present invention, third color (e.g., yellow) dot placement is decided dependent on the placement of the first color (e.g., cyan) and second color (e.g., magenta) dots; however, decisions regarding the placement of yellow dots are not made jointly with decisions about the placement of cyan and magenta dots. Instead, decisions about yellow dot placement are delayed until after decisions are made about the placement of the cyan and magenta dots. The placement of cyan and magenta dots is not changed to accommodate yellow dots. Rather, yellow dot placement is decided on the basis of when overlap of a yellow dot with a cyan and/or magenta dot is justified. As a result of these improvements, the complexity of the computations, and the computational resources required for the computations, are not unduly increased.

By placing the yellow dots after, but dependent on, the placement of the cyan and magenta dots, superior color smoothness with reduced color fluctuation is achieved by the present invention. The present invention reduces the number of instances in which interference occurs between a yellow dot and a cyan dot (this would produce a green dot) and between a yellow dot and a magenta dot (this would produce a red dot), creating a more pleasing color pattern.

Figure 4:
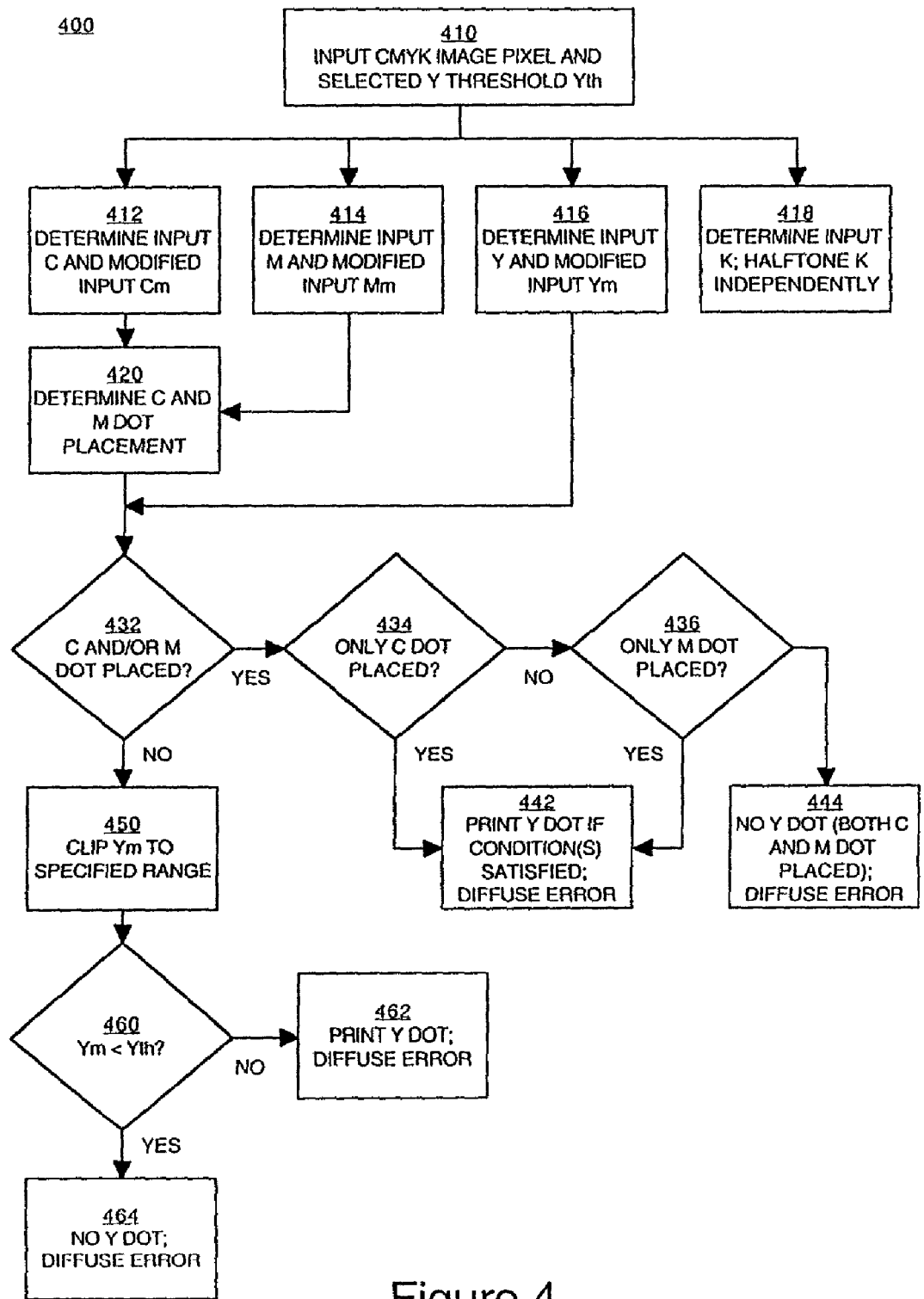
FIG. 4 is a flowchart of one embodiment of a method for considering yellow dot placement dependent on cyan and magenta dot placement in accordance with the present invention.

FIG. 4 is a flowchart of one embodiment of a method 400 for considering yellow dot placement dependent on cyan and magenta dot placement in accordance with the present invention. Although described for four colors in particular (cyan, magenta, yellow and black), it is appreciated that the method 400 can be implemented for different colors, and that method 400 can be implemented for more than four colors. Method 400 can be implemented on computer system 10 or on printer 20 (FIG. 1), or some aspects of method 400 can be implemented on computer system 10 while other aspects are implemented on printer 20.

In step 410 of FIG. 4, the RGB image converted to CMYK color space is received for each pixel (as in step 230 of FIG. 2). Also, for each potential print location, the threshold value ($Y_{th}$) is specified for the color yellow. In steps 412, 414, 416 and 418, the intensity values are determined for the colors cyan, magenta, yellow and black, respectively. At this point in method 400, the intensity values for these colors are represented as 8 bits per color, and so the intensity values are halftoned (converted to binary values) as described above (refer to step 240 of FIG. 2).

In accordance with the present embodiment of the present invention, the cyan (C), magenta (M) and yellow (Y) planes are halftoned in a dependent manner using an error diffusion technique. Using a known error diffusion technique in combination with the method of the present invention introduced herein, modified input values $C_m$, $M_m$, and $Y_m$ are determined for each print location (or pixel) by including the error(s) ($C_e$, $M_e$, and $Y_e$, respectively) accumulated from the processing of neighboring pixels. For example, $C_m = C + C_e$, where $C_e$ is the accumulated error. In the case in which a pixel is the first pixel to be processed, the error term may be set to zero or to a low level random value.

In the present embodiment, the color black is halftoned independently of the C, M and Y planes; however, in an alternate embodiment, the black plane can be halftoned with the C, M and Y planes in a dependent manner.

In step 420 of FIG. 4, based on the values of C, $C_m$, M and $M_m$, a decision is made whether to place a cyan dot, magenta dot, both a cyan and a magenta dot, or neither a cyan nor a magenta dot at the current print location. This decision can be made using a known technique, such as the technique described in U.S. Pat. No. 5,949,965 (Gondek) referenced previously herein. Another technique for making this decision is described in U.S. Pat. No. 6,057,933 by Kevin R. Hudson et al. and entitled "Table Based Fast Error Diffusion Halftoning Technique," issued May 2, 2000, assigned to the assignee of the present invention and hereby incorporated by reference. Other techniques can be used.

The remaining steps of method 400 are concerned with a decision about whether or not to place a yellow dot at the current print location, dependent on the decision of whether or not a cyan dot and/or a magenta dot has been placed at the current print location. There are four cases that need to be considered for each print location: 1) neither a cyan nor a magenta dot has been placed; 2) only a cyan dot has been placed; 3) only a magenta dot has been placed; and 4) both a cyan dot and a magenta dot have been placed.

In step 432 of FIG. 4, the determination is made with regard to whether a cyan and/or a magenta dot has been placed at the current print location (that is, cases 2, 3 and 4 above). If so, method 400 proceeds to step 434; otherwise, method 400 proceeds to step 450.

In step 434, the determination is made with regard to whether only a cyan dot has been placed at the current print location. If so, method 400 proceeds to step 442; otherwise, method 400 proceeds to step 436. In step 436, it is determined whether only a magenta dot has been placed at the current print location. If so, method 400 proceeds to step 442; otherwise, method 400 proceeds to step 444. It is worth noting that the determination of whether a magenta dot has been placed can be made before or simultaneously with the determination of whether a cyan dot has been placed.

In step 442, the determination has been made that only a cyan dot or only a magenta dot has been placed at the current print location (e.g., cases 2 and 3 above). Therefore, a yellow dot may be placed at that location, depending on whether or not additional conditions are satisfied. Any error is diffused to selected neighboring pixels. These additional conditions are described in conjunction with FIG. 5, below.

In step 444, the determination has been made that both a cyan dot and a magenta dot have been placed at the current print location (e.g., case 4 above). In this case, printing a yellow dot would result in a composite black dot. With a four color printer, as in the present embodiment, a composite black dot is generally undesirable and the halftoning of the black plane (step 418) takes care of instances in which a black dot is needed. As a result, a yellow dot is not placed when both a cyan dot and a magenta dot have been placed at the current print location. Any error is diffused to selected neighboring pixels.

In step 450, the determination has been made that neither a cyan dot nor a magenta dot have been placed at the current print location (e.g., case 1 above). Thus, a yellow dot can be placed without interfering with a cyan dot or a magenta dot. In this case, the determination of whether or not to place a yellow dot at the current print location is made by comparing the modified yellow input value ($Y_m$) to a specified threshold.

In the present embodiment of the present invention, $Y_m$ is limited to a certain specified range of values, and so $Y_m$ is "clipped" (reduced in value) by an amount needed to put $Y_m$ in that range. This is done to prevent the accumulated error ($Y_e$) from growing without limit. That is, as described above, there may be instances in which, using a conventional error diffusion technique, a yellow dot may be placed because $Y_m$ is above $Y_{th}$ but, using the method of the present invention, the decision is made to not print the yellow dot. The error term arising from this decision is diffused to neighboring pixels. At another pixel subsequently processed, $Y_m$ may again be above $Y_{th}$, but again the method of the present invention results in the yellow dot not being printed at that location, and again the error is diffused. Therefore, because the decision to print a yellow dot is deferred one or more time, the accumulated error arising from each decision would continue to grow unless it is limited. In addition, unless $Y_m$ is limited, decisions may be made to print a yellow dot in several adjacent or proximate locations before $Y_m$ is ultimately reduced to a value less than $Y_{th}$, manifesting a yellow saturation effect.

Therefore, in step 450, $Y_m$ is clipped to a specified range in order to prevent yellow saturation artifacts from manifesting a dominating yellow hue that would occur if the clipping was not performed. In the present embodiment, the range of values defined for $Y_m$ is $[-128, 255+128]$.

In step 460, $Y_m$ is compared to $Y_{th}$. In the present embodiment, if $Y_m$ is greater than or equal to the threshold, method 400 proceeds to step 462, and a yellow dot is placed. If $Y_m$ is less than the threshold, method 400 proceeds to step 464, and no yellow dot is placed. In both cases, any error is diffused to selected neighboring pixels.

Figure 5:
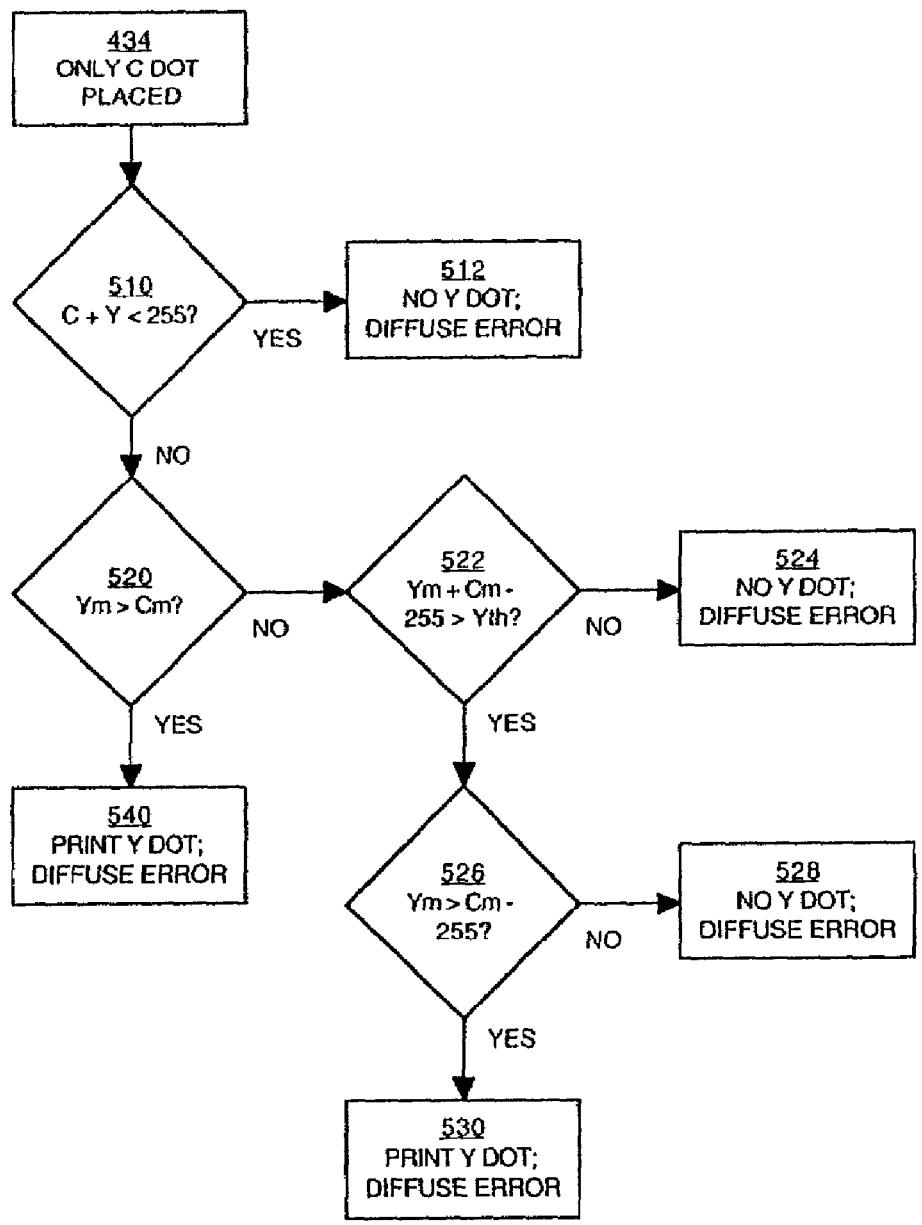
FIG. 5 is a flowchart of one embodiment of a method for considering yellow dot placement with cyan dot placement in accordance with the present invention.

FIG. 5 is a flowchart of one embodiment of a method 442 for considering yellow dot placement with cyan dot placement in accordance with the present invention. Although described for the case in which a cyan dot has been placed, method 442 is equally applied to the case in which a magenta dot has been placed.

In step 434, as described above, only a cyan dot has been placed. In step 510, in the present embodiment, a determination is made whether the initial values of Y and C (that is, the intensity values of yellow and cyan without including any accumulated error), when added together, are less than 255. If C+Y is less than 255, then there is not more than 100 percent fill in the input tone with the cyan and yellow planes considered together. As a result, because the cyan dot has already been placed, a yellow dot is not placed and any error is diffused (step 512). Thus, in accordance with the present invention, if a cyan dot has been placed, and the fill at that print location is not more than 100 percent, then a yellow dot is not placed at that location.

If C+Y is greater than or equal to 255, then there is more than 100 percent fill in the input tone, indicating that a green dot may be required. Accordingly, method 442 proceeds to step 520 to allow a decision to be made about whether a green dot is required.

In step 520, if $Y_m$ is greater than $C_m$, then a yellow dot is placed and any remaining error is diffused to selected neighboring pixels (step 540). Otherwise, method 442 proceeds to step 522.

In step 522, in the present embodiment, the sum of $Y_m$ and $C_m$ is compared to $Y_{th}$ to determine if the sum is substantially greater than the threshold. Specifically, in the present embodiment, the sum of $Y_m$ and $C_m$, minus 255, is compared to $Y_{th}$. If the sum of $Y_m$ and $C_m$, minus 255, is greater than $Y_{th}$, then method 442 proceeds to step 526. Otherwise, no yellow dot is printed and any error is diffused (step 524).

In step 526, in the present embodiment, a determination is made with regard to whether the difference between $Y_m$ and $C_m$ is sufficiently small to justify printing a yellow dot. Specifically, in the present embodiment, the determination is made whether $Y_m > C_m$ minus 255. If not, no yellow dot is placed, and any error is diffused (step 528). If so, a yellow dot is placed and any remaining error is diffused (step 530). Thus, as a result of steps 522 and 526, a yellow dot is placed only if the sum of $Y_m$ and $C_m$ is sufficiently large, and the difference between $Y_m$ and $C_m$ is sufficiently small.

In summary, embodiments of the present invention provide a method and system thereof that can consider the cyan, magenta and yellow planes together without substantially increasing computational complexity and without consuming significant computational resources. By treating the cyan, magenta and yellow planes dependently, the present invention minimizes color fluctuations in the printed image, resulting in superior color smoothness and improving the quality of the printed image. In accordance with the present invention, instances of undesirable red and green dots can be eliminated, resulting in a smoother pattern in the printed image.

The preferred embodiment of the present invention, delayed decision dot placement for plane-dependent CMYK error diffusion, is thus described. While the present invention has been described in particular embodiments, it should be appreciated that the present invention should not be construed as limited by such embodiments, but rather construed according to the following claims.

What is claimed is:

1. A printing method comprising:
   determining locations in a printed image for a plurality of first color dots and locations in said printed image for a plurality of second color dots; and
   determining locations in said printed image for a plurality of third color dots, wherein said locations for said third color dots are dependent on said locations of said first color dots and also dependent on said locations of said second color dots, wherein placement of each of said third color dots is subject to a first condition that prevents a dot of said third color from being printed at a location at which both a dot of said first color and a dot of said second color have been placed.

2. The printing method of claim 1 comprising:
   first determining whether a dot of said first color is to be printed at a particular location;
   second determining whether a dot of said second color is to be printed at said particular location;
   subsequent to said first determining and said second determining, determining whether a dot of said third color is to be printed at said particular location, wherein printing of said dot of said third color at said particular location is dependent on satisfying a second condition for deciding when overlap of said dot of said third color with a dot of one other color at said particular location is acceptable; and printing said dot of said third color at said particular location when said second condition is satisfied and otherwise not printing said dot of said third color.

3. The printing method of claim 2 wherein said second condition is satisfied when neither a dot of said first color nor a dot of said second color are to be printed at said particular location.

4. The printing method of claim 2 further comprising:
performing error diffusion to modify an intensity value of said dot of said third color resulting in a modified third color intensity value for said dot of said third color; and limiting said modified third intensity value to a predefined range; wherein said second condition is satisfied when neither a dot of said first color nor a dot of said second color are to be printed at said particular location and when a third condition based on said modified third color intensity value is satisfied.

5. The printing method of claim 2 comprising:
determining an amount of fill at said particular location when it is determined that a dot of another color is to be printed at said particular location.

6. The printing method of claim 5 wherein said second condition is not satisfied when there is less than 100 percent fill at said particular location.

7. The printing method of claim 5 further comprising:
performing error diffusion to modify an intensity value of said dot of said third color resulting in a modified third color intensity value for said dot of said third color; and performing error diffusion to modify an intensity value of said dot of said first color resulting in a modified first color intensity value for said dot of said first color; wherein said second condition is satisfied when there is greater than or equal to 100 percent fill at said particular location and when a third condition based on said modified third color intensity value and said modified first color intensity value is satisfied.

8. The printing method of claim 1 wherein said first color and said second color are selected from the group consisting of cyan and magenta and wherein said third color is yellow.

9. The printing method of claim 1 wherein said printing is performed using an inkjet printer.

10. A system used in printing, said system comprising:
a memory unit; and
a controller coupled to said memory unit, said controller for executing a printing method, said printing method comprising:

determining locations in a printed image for a plurality of first color dots and locations in said printed image for a plurality of second color dots; and determining locations in said printed image for a plurality of third color dots, wherein said locations for said third color dots are dependent on said locations of said first color dots and also dependent on locations of said second color dots, wherein a dot of said third color and a dot of said first color are both printable at a particular location provided there is at least 100 percent fill at said particular location and provided a first modified intensity value of said dot of said third color is greater than a second modified intensity value of said dot of said first color, said first and second modified intensity values comprising respective first and second intensity values that were modified using error diffusion.

11. The system of claim 10 wherein said dot of said third color is printable at said particular location provided neither a dot of said first color nor a dot of said second color are to be printed at said particular location.

12. The system of claim 10 wherein said dot of said third color is not printed at said particular location if both a dot of said first color and a dot of said second color are to be printed at said particular location.

13. The system of claim 10 wherein said first color and said second color are selected from the group consisting of cyan and magenta and wherein said third color is yellow.

14. The system of claim 10 wherein said printing is performed using an inkjet printer.

15. A computer-usable medium having computer-readable code stored thereon for causing a system used in printing to perform a printing method comprising:

determining locations in a printed image for a plurality of first color dots and locations in said printed image for a plurality of second color dots; and determining locations in said printed image for a plurality of third color dots, wherein said locations for said third color dots are dependent on said locations of said first color dots and also dependent on said locations of said second color dots, wherein a dot of said third color and a dot of said first color are both printable at a particular location provided there is at least 100 percent fill at said particular location, provided a first modified intensity value of said dot of said first color is greater than a second modified intensity value of said dot of said third color, wherein said first and second modified intensity values comprise respective first and second intensity values that have been modified using error diffusion, provided the sum of said first and second modified intensity values is greater than a first threshold and provided the difference between said first and second modified intensity values is less than a second threshold.

16. The computer-usable medium of claim 15 wherein said dot of said third color is printable at said particular location provided neither a dot of said first color nor a dot of said second color are to be printed at said particular location.

17. The computer-usable medium of claim 15 wherein said dot of said third color is not printed at said particular location if both a dot of said first color and a dot of said second color are to be printed at said particular location.

18. The computer-usable medium of claim 15 wherein said first color and said second color are selected from the group consisting of cyan and magenta and wherein said third color is yellow.

19. The computer-usable medium of claim 15 wherein said printing is performed using an inkjet printer.

* * * * *